US012262445B2

(12) United States Patent
Chen et al.

(10) Patent No.: US 12,262,445 B2
(45) Date of Patent: Mar. 25, 2025

(54) METHOD OF SMALL DATA TRANSMISSION AND RELATED DEVICE (71) Applicant: SHARP KABUSHIKI KAISHA, Sakai (JP)

(72) Inventors: Hung-Chen Chen, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 349 days.

(21) Appl. No.: 17/788,602

(22) PCT Filed: Dec. 31, 2020

(86) PCT No.: PCT/CN2020/141920
§ 371 (c)(1),
(2) Date: Jun. 23, 2022

(87) PCT Pub. No.: WO2021/136474
PCT Pub. Date: Jul. 8, 2021

(65) Prior Publication Data
US 2023/0030443 A1 Feb. 2, 2023

Related U.S. Application Data (60) Provisional application No. 62/955,718, filed on Dec. 31, 2019.

(51) Int. Cl.
H04W 76/38 (2018.01)
H04W 56/00 (2009.01)
(Continued)

(52) U.S. Cl.
CPC ....... *H04W 76/38* (2018.02); *H04W 56/0045* (2013.01); *H04W 72/23* (2023.01); *H04W 74/0833* (2013.01); *H04W 76/27* (2018.02)

(58) Field of Classification Search
CPC ..... H04W 76/38; H04W 76/27; H04W 72/23; H04W 56/0045; H04W 74/0833
See application file for complete search history.

(56) References Cited

U.S. PATENT DOCUMENTS

2016/0374048 A1 12/2016 Griot et al.
2018/0152984 A1 5/2018 Palanisamy et al.
(Continued)

FOREIGN PATENT DOCUMENTS

| CN | 107645779 A | 1/2018 |
| CN | 109845382 A | 6/2019 |
| CN | 110139365 A | 8/2019 |

OTHER PUBLICATIONS

Ericsson, "MT early data after preamble", R2-1910421, 3GPP TSG-RAN WG2 #107, Prague, Czech Republic Aug. 26-30, 2019 (Aug. 15, 2019).
(Continued)

Primary Examiner — Brenda H Pham
(74) Attorney, Agent, or Firm — ScienBiziP, P.C.

(57) ABSTRACT

A method of a small data transmission for a user equipment (UE) is provided. The method includes receiving, from a base station (BS), a radio resource control (RRC) release message, the RRC release message including a configured grant configuration and a first timer associated with the configured grant configuration, the configured grant configuration indicating an uplink (UL) resource; transitioning to an RRC_INACTIVE state in response to receiving the RRC release message; starting the first timer in response to receiving the RRC release message; determining whether the UL resource is valid, the UL resource being invalid at least when the first timer expires; and transmitting UL data on the UL resource after the UE determines that the UL resource is valid.

20 Claims, 3 Drawing Sheets (51) Int. Cl.
  *H04W 72/23* (2023.01)
  *H04W 74/0833* (2024.01)
  *H04W 76/27* (2018.01)

(56) References Cited

U.S. PATENT DOCUMENTS

2018/0234941 A1* 8/2018 Kim .................. H04W 76/19
2019/0289660 A1 9/2019 Yi et al.
2019/0387568 A1 12/2019 Teyeb et al.

OTHER PUBLICATIONS

3GPP TS 38.321, "3rd Generation Partnership Project; Technical Specification Group Radio Access Network; NR; Medium Access Control (MAC) protocol specification (Release 15)", Technical Specification, V15.7.0 (Sep. 2019).
3GPP TS 38.300, "3rd Generation Partnership Project; Technical Specification Group Radio Access Network; NR; NR and NG-RAN Overall Description; Stage 2 (Release 15)", Technical Specification, V15.7.0 (Sep. 2019).
3GPP TS 38.214, "3rd Generation Partnership Project; Technical Specification Group Radio Access Network; NR; Physical layer procedures for data (Release 15)", Technical Specification, V15.7.0 (Sep. 2019).
Samsung, "On RRC message for transition into RRC_IDLE and Rrc_INACTIVE", R2-1804868, 3GPP TSG-RAN WG2 #101bis, Sanya, China, Apr. 16-20, 2018, section 2.

* cited by examiner

METHOD OF SMALL DATA TRANSMISSION AND RELATED DEVICE

CROSS-REFERENCE TO RELATED APPLICATION(S)

The present disclosure is the National Stage of International Patent Application No. PCT/CN2020/141920, filed on Dec. 31, 2020, entitled "METHOD OF SMALL DATA TRANSMISSION AND RELATED DEVICE," which claims the benefit of and priority to U.S. Provisional Patent Application Ser. No. 62/955,718, filed on Dec. 31, 2019, entitled "Mechanism for Small Data Transmission". The contents of all of the above-mentioned applications are hereby fully incorporated by reference into the present disclosure.

FIELD

The present disclosure is generally related to wireless communications and, more specifically, to a method of a small data transmission and a related device.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of small data transmission and a related device.

According to an aspect of the present disclosure, a method of small data transmission for a user equipment (UE) is provided. The method includes receiving, from a base station (BS), a radio resource control (RRC) release message, the RRC release message including a configured grant configuration and a first timer associated with the configured grant configuration, the configured grant configuration indicating an uplink (UL) resource; transitioning to an RRC_INACTIVE state in response to receiving the RRC release message; starting the first timer in response to receiving the RRC release message; determining whether the UL is valid, the UL resource being invalid at least when the first timer expires; and transmitting UL data on the UL resource after the UE determines that the UL resource is valid.

According to another aspect of the present disclosure, a UE for performing small data transmission is provided. The UE includes at least one processor, and at least one memory coupled to the at least one processor, the at least one memory storing computer-executable instructions that, when executed by the at least one processor, cause the UE to perform the above-disclosed method of performing the small data transmission.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the disclosed implementations are directed to software installed and executing on computer hardware, nevertheless, alternative implementations as firmware, as hardware, or as a combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or an New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

It should be noted that, in the present disclosure, a UE may include, but is not limited to, a mobile station, a mobile terminal or device, a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the downlink (DL) and optionally UL resources to at least one UE within its radio coverage for DL and optionally UL packet transmissions). The BS may communicate with one or more UEs in the radio communication system via the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, and the UL transmission data should also be configurable, for example, based on the network dynamics of NR. Besides, an SL resource may also be provided via an NR frame to support ProSe services or V2X services.

For saving UE power and shortening data transmission latency, NR introduces a new RRC state (e.g., Inactive state (RRC_INACTIVE state)). The RRC_INACTIVE state is a state where a UE remains in connection management connected (CM-CONNECTED) and can move within an area configured by NG-RAN (e.g., a RAN Notification Area (RNA)) without notifying NG-RAN. When the UE is in the RRC_INACTIVE state, the last serving gNB keeps the UE context and the UE-associated NG connection with the serving Access and Mobility Management Function (AMF) and User Plane Function (UPF).

In addition, a 2-step Random Access (RA) procedure is also introduced in NR for faster transitioning from the RRC_IDLE state to the RRC_CONNECTED state or from the RRC_INACTIVE state to the RRC_CONNECTED state. As stated in the 3GPP TS 38.300 v15.7.0, the MSGA of the 2-step Contention-Based Random Access (CBRA) includes a preamble on a Physical Random Access Channel (PRACH) and a payload on a Physical Uplink Shared Channel (PUSCH). After the MSGA transmission, the UE monitors for a response from the network within a configured window. If a contention resolution is successful upon receiving the network response, the UE ends the RA procedure. If a fallback indication is received in the MSGB of the 2-step CBRA, the UE performs the MSG3 transmission and monitors the Physical Downlink Shared Channel (PDSCH) for contention resolution. On the other hand, if the contention resolution is not successful after the MSG3 transmission, the UE goes back to the MSGA transmission. It should be noted that the MSGA is represented as preamble and payload transmissions of the 2-step RA procedure. The MSGB is represented as a response to the MSGA. The MSGB may include response(s) for contention resolution, fallback indication(s), and a backoff indication.

In NR (as introduced in the 3GPP TS 38.321 v15.7.0), there are two types of transmission without dynamic grant:
configured grant Type 1, where a UL grant is provided by the RRC entity (e.g., the RRC entity of the gNB) and stored as a configured UL grant by the Medium Access Control (MAC) entity of the UE. Specifically, with configured grant Type 1, the RRC entity directly provides the configured UL grant (including the periodicity).
configured grant Type 2, where a UL grant is provided by Physical Downlink Control Channel (PDCCH) (e.g., from the gNB to the UE) and stored or cleared (by the MAC entity of the UE) as a configured uplink grant based on L1 signaling that indicates configured UL grant activation or deactivation. Specifically, with configured grant Type 2, the RRC entity defines the periodicity of the configured UL grant when the PDCCH addressed to Configured Scheduling-Radio Network Temporary Identifier (CS-RNTI) can either activate the configured UL grant or deactivate the configured UL grant. For example, a PDCCH addressed to CS-RNTI indicates that the UL grant can be implicitly reused according to the periodicity defined by the RRC entity until deactivated.

With the configured grants, the UE may transmit UL data more efficiently since the UE may not need to request for (dynamic) UL grants via a Scheduling Request (SR) procedure and a Buffer Status Report (BSR). It should be noted that the configured grant is only supported when a UE is in the RRC_CONNECTED state.

Currently, the UEs with infrequent (periodic and/or non-periodic) data transmission are generally maintained by the network (NW) in the RRC_INACTIVE state, for saving UE power and shortening data transmission latency. Until 3GPP Release 16, a UE in the RRC_INACTIVE state cannot transmit UL data directly. That is, the UE needs to resume the connection (e.g. transition from the RRC_INACTIVE state to the RRC_CONNECTED state) for UL data transmission. Connection setup (or resumption) and subsequent release (or suspension) to the RRC_INACTIVE state may occur in each UL data transmission, even for small data transmission. Consequently, this may result in unnecessary power consumption and signaling overhead for both the UE side and the NW side.

To support small data transmission in the RRC_INACTIVE state, a random access channel (RACH)-based scheme (e.g., 2-step RA procedure or 4-step RA procedure) for small data transmission or a pre-configured PUSCH resource for small data transmission is disclosed.

The methods for transmitting UL data via an RA procedure in the RRC_INACTIVE state, transmitting UL data via a pre-configured PUSCH resource in the RRC_INACTIVE state, providing pre-configured PUSCH resources in the RRC_INACTIVE state, determining a valid pre-configured PUSCH resource for small data transmission, and fallback to the RACH-based schemes from the pre-configured PUSCH resource for small data transmission are disclosed as follows.

Small Data Transmission via RA Procedure

In some implementations, the RA procedure (e.g., 2-step RA procedure or 4-step RA procedure) may be triggered for small data transmission in the RRC_INACTIVE state (e.g., the RA procedure associated with an RRC resume procedure for small data transmission). In some implementations, the RA procedure (e.g., 2-step RA procedure or 4-step RA procedure) may be triggered for small data transmission in the RRC_INACTIVE state if the RA procedure for small data transmission is configured/indicated/allowed by the NW (e.g., a BS) via system information, dedicated signaling, or in an RRC Release message with a suspend configuration. A UE may transition to the RRC_INACTIVE state from the RRC_CONNECTED state when the UE receives the RRC Release message with the suspend configuration or may remain in the RRC_INACTIVE state when the UE receives the RRC Release message with the suspend configuration. In some implementations, to apply an RA procedure for small data transmission in a cell that is configured with Supplementary Uplink (SUL), the BS may explicitly signal which carrier to use (e.g., UL or SUL). In some implementations, to apply an RA procedure for small data transmission in a cell that is configured with SUL, the BS may explicitly signal whether SUL is used for small data transmission. In some implementations, to apply an RA procedure for small data transmission in a cell that is configured with SUL, or configured with UL and SUL, the UE may be pre-configured (or by default) to perform the small data transmission via an RA procedure on a carrier (e.g., UL carrier, SUL carrier, higher-frequency carrier, or lower-frequency carrier).

In some implementations, UL data (e.g., small data) may be transmitted in the MSG3 of a 4-step RA procedure via a UL grant received in the MSG2 (or an associated random access response (RAR)). In some implementations, an indication may be included (or used) in the MSG3 for indicating that the RA procedure (e.g., a 4-step RA procedure) is used for small data transmission. For example, an RRC Resume Request message carried in the MSG3 may include the indication for indicating that the associated RRC resume procedure is used for small data transmission. In another example, an RRC Resume Request message carried in the MSG3 without the indication may mean that the associated RRC resume procedure is used for normal purposes (e.g., not for small data transmission). In some implementations, an indication may be included (or used) in the MSG3 for indicating that whether the small data transmission is complete. For example, if the indication is set to true, the BS may consider that the small data transmission is complete and no further UL grant may be configured (e.g., via the MSG4). On the other hand, if the indication is set to false (or not present or absent), the BS may consider that the small data transmission is not complete yet (e.g., subsequent data transmission is required) and may configure a subsequent UL grant (e.g., via the MSG4 or via an RRC Release message with a suspend configuration) to the UE or may command the UE to transition back to the RRC_CONNECTED state. It should be noted that the RRC Release message with the suspend configuration may include pre-configured PUSCH configuration(s)/resource(s) for subsequent data transmission(s). In another example, if the indication is set to false (or not present or absent), the BS may consider that the small data transmission is complete and no further UL grant may be configured (e.g., via the MSG4). On the other hand, if the indication is set to true, the BS may consider that the small data transmission is not complete yet (e.g., subsequent data transmission is required) and may configure subsequent UL grant (e.g., via the MSG4 or via an RRC Release message with a suspend configuration) to the UE or may command the UE to transition back to the RRC_CONNECTED state. It should be noted that the RRC Release message with the suspend configuration may include pre-configured PUSCH configuration(s)/resource(s) for subsequent data transmission(s). The abovementioned settings (e.g., true/false) for the indication may be applied for the implementations of the present disclosure. In some implementations, an indication may be included (or used) in other UL grant(s) (e.g., the subsequent UL grant configured by the BS) to indicate that whether the small data transmission is complete or not. For another example, the UE may transmit the indication in the same PUSCH resource on which the UE transmits the small data and the indication may correspond to the small data. It should be noted that the indication may be transmitted after the corresponding small data in the same PUSCH resource. Thus, if the indication is set to be false (or not present or absent), the UE may further receive the UL grant (e.g., via the MSG4, via downlink control information (DCI), or via dedicated signaling) for the subsequent small data transmission. In some implementations, the BS may indicate whether a 4-step RA procedure for small data transmission is allowed for a UE in the RRC_INACTIVE state via RRC signaling (e.g., system information or an RRC Release message with a suspend configuration). For example, a cell may broadcast an indication via system information to indicate whether a UE is allowed to transmit small data in the RRC_INACTIVE state via a 4-step RA procedure. A UE that receives the system information indicating that the UE is allowed for small data transmission in the RRC_INACTIVE state may perform small data transmission when the UE enters the RRC_INACTIVE state. In addition, the UE that receives the system information indicating that the UE is allowed for small data transmission in the RRC_INACTIVE state may perform small data transmission via a 4-step RA procedure when the UE enters the RRC_INACTIVE state. In another example, a UE may receive an indication via dedicated signaling (e.g., in an RRC Release message with a suspend configuration) that indicates whether the UE is allowed to transmit small data in the RRC_INACTIVE state via a 4-step RA procedure. A UE that receives the dedicated signaling indicating that the UE is allowed for small data transmission in the RRC_INACTIVE state may perform small data transmission when the UE enters the RRC_INACTIVE state. In addition, the UE that receives the dedicated signaling indicating that the UE is allowed for small data transmission in the RRC_INACTIVE state may perform small data transmission via a 4-step RA procedure when the UE enters the RRC_INACTIVE state.

In some implementations, UL data (e.g., small data) may be transmitted in a PUSCH payload of the MSGA of a 2-step RA procedure. In some implementations, the small data directly transmitted in the PUSCH payload of the MSGA may implicitly notify the gNB that the RA procedure (e.g., a 2-step RA procedure) is for the small data transmission. In some implementations, an indication may be included (or used) in the MSGA for indicating that the RA procedure is used for small data transmission. For example, an RRC Resume Request message carried in the MSGA may include an indication for indicating the associated RRC resume procedure is for small data transmission. In another example, an RRC Resume Request message carried in the MSGA without the indication may indicate the associated RRC resume procedure is used for normal purposes (e.g., not for small data transmission). In some implementations, an indication may be included (or used) in the MSGA for indicating whether the small data transmission is complete. For example, if an indication is set to true, the BS may consider that the small data transmission is complete and no further UL grant may be configured (e.g., via the MSGB). It should be noted that the small data transmission indicated by (or associated with) the indication in MSGA may be the small data transmission in the PUSCH of this MSGA of a 2-step RA procedure, or may be the small data transmission performed in a previous RA procedure or triggered by a previous RA procedure, where the RA procedure may be a 2-step RA procedure, 4-step RA procedure, or a 2-step RA fallback to a 4-step RA procedure. For example, if an indication is set to false (or not present, or absent), the BS may consider that the small data transmission is not complete yet (e.g., subsequent data transmission is required) and may configure a subsequent UL grant (e.g., via the MSGB or via an RRC Release message with a suspend configuration) to the UE or may command the UE to transition back to the RRC_CONNECTED state. Note that the RRC Release message with the suspend configuration may include pre-configured PUSCH configuration(s)/resource(s) for subsequent data transmission(s). In some implementations, an indication may be included in other UL grant(s) (e.g., the subsequent UL grant configured by the BS) for indicating whether the small data transmission is complete or not. For another example, the UE may transmit the indication in the same PUSCH resources on which the UE transmits the small data and the indication may correspond to the small data. It should be noted that the indication may be transmitted after the corresponding small data in the same PUSCH resources. Thus, if the indication is set to be false (or not present or absent), the UE may further receive the UL grant (e.g., via the MSGB, via DCI, or via dedicated signaling) for the subsequent small data transmission. In some implementations, the BS may indicate whether a 2-step RA procedure for small data transmission is allowed for a UE in the RRC_INACTIVE state via RRC_signaling (e.g., system information or an RRC Release message with a suspend configuration). For example, a cell may broadcast an indication via system information to indicate whether a UE is allowed to transmit small data in the RRC_INACTIVE state via a 2-step RA procedure. A UE that receives the system information indicating that the UE is allowed to transmit small data in the RRC_INACTIVE state may perform small data transmission when the UE enters the RRC_INACTIVE state. In addition, the UE that receives the system information indicating that the UE is allowed to transmit small data in the RRC_INACTIVE state may perform small data transmission via a 2-step RA procedure when the UE enters the RRC_INACTIVE state. In another example, a UE may receive an indication via dedicated signaling (e.g., in an RRC Release message with a suspend configuration) to indicate whether a UE is allowed to transmit small data in the RRC_INACTIVE state via a 2-step RA procedure. A UE that receives the dedicated signaling indicating that the UE is allowed to transmit small data transmission in the RRC_INACTIVE state may perform small data transmission when the UE enters the RRC_INACTIVE state. In addition, the UE that receives the dedicated signaling indicating that the UE is allowed to transmit small data transmission in the RRC_INACTIVE state may perform small data transmission via a 2-step RA procedure when the UE enters the RRC_INACTIVE state.

In some implementations, a UE (e.g., in the RRC_CONNECTED state or in the RRC_INACTIVE state) may receive an RRC Release message with a suspend configuration to indicate the allowed logical channel(s) or Data Radio Bearer (DRB)(s). The allowed logical channel(s) or DRB(s) may be the logical channel(s) or DRB(s) allowed for UL data transmission in the RRC_INACTIVE state. Specifically, small data transmission may be configured per DRB. In some implementations, only the UL data associated with the allowed logical channel(s) or DRB(s) may be transmitted via an RA procedure for small data transmission or via an RRC procedure for small data transmission. In some implementations, if an RRC Release message including a suspend configuration is received by the UE and the allowed logical channel(s) or DRB(s) are indicated (e.g., in the RRC Release message including the suspend configuration), the UE (or the RRC entity of the UE) may suspend all SRB(s) and DRB(s), except SRB 0 and the allowed DRB(s). The UE (or the RRC entity of the UE) may indicate the Packet Data Convergence Protocol (PDCP) entity suspending to lower layers of all DRB(s), except the allowed DRB(s). In some implementations, if an RRC Release message including a suspend configuration is received by the UE and the allowed logical channel(s) or DRB(s) are indicated (e.g., in the RRC Release message including the suspend configuration), the UE (or the RRC entity of the UE) may still suspend all SRB(s) and DRB(s), except SRB 0. The UE (or the RRC entity of the UE) may still indicate the PDCP entity suspending to lower layers of all DRB(s). In this case, an allowed DRB may be resumed (or reestablished) when there is UL data belonging to the allowed DRB and/or the small data transmission (via RA procedure or via configured grant(s)) in RRC_INACTIVE state is applicable. It should be noted that the allowed DRB(s) may be the DRB(s) for small data transmission in the RRC_INACTIVE state. The allowed DRB(s) may be pre-configured to the UE (e.g., pre-configured parameters for Service Data Adaptation Protocol (SDAP) entity, PDCP entity and/or 5G Quality of Service (QoS) Indicator (5QI) for the allowed DRB(s)). The allowed DRB(s) may be configured to the UE via dedicated signaling (e.g., an RRC Release with a suspend configuration) from the BS.

In some implementations, a UE may receive an RRC Release message with a suspend configuration to indicate the non-allowed logical channel(s) or DRB(s) in the RRC_INACTIVE state. That is, the data associated with the non-allowed logical channel(s) or DRB(s) may not be transmitted via an RA procedure. In some implementations, if an RRC Release message including a suspend configuration is received and the non-allowed logical channel(s) or DRB(s) are indicated (e.g., in the RRC Release message including the suspend configuration), the UE may suspend all SRB(s) and non-allowed DRB(s), except SRB 0. The UE may not suspend other DRB(s). The UE may indicate the PDCP entity suspending to lower layers of non-allowed DRB(s). The UE may not indicate the PDCP entity suspending to lower layers of other DRB(s). In some implementations, if an RRC Release message including a suspend configuration is received and the non-allowed logical channel(s) or DRB(s) are indicated (e.g., in the RRC Release message including the suspend configuration), the UE may still suspend all SRB(s) and DRB(s), except SRB 0. The UE (or the RRC entity of the UE) may still indicate the PDCP entity suspending to lower layers of all DRB(s). In this case, an DRB that is not a non-allowed DBR may be resumed (or reestablished) when there is UL data belonging to the DRB and/or the small data transmission (via RA procedure or via configured grant(s)) in RRC_INACTIVE state is applicable. It should be noted that the non-allowed DRB(s) may be the DRB(s) that is not allowed to perform small data transmission in the RRC_INACTIVE state. The non-allowed DRB(s) may be pre-configured to the UE (e.g., pre-configured parameters for SDAP entity, PDCP entity and/or 5QI for the allowed DRB(s)). The non-allowed DRB(s) may be configured to the UE via dedicated signaling (e.g., an RRC Release with a suspend configuration) from the BS.

It should be noted that when upper layers request the PDCP entity suspending, the transmitting PDCP entity may set TX_NEXT to the initial value. TX_NEXT is a state variable for indicating a COUNT value of the next PDCP Service Data Unit (SDU) to be transmitted and its initial value is set to '0'. The COUNT value is composed of a Hyper Frame Number (HFN) and the PDCP Sequence Number (SN). The size of the HFN part in bits is equal to 32 minus the length of the PDCP SN. It is also noted that when upper layers request the PDCP entity suspending, the transmitting PDCP entity may discard all stored PDCP Protocol Data Units (PDUs).

In some implementations, if an RRC Release message including a suspend configuration is received by the UE and the small data transmission that is allowed in the RRC_INACTIVE state is implicitly or explicitly indicated as mentioned above, the UE may suspend all SRB(s) and DRB(s), except SRB 0 and default DRB(s). The UE may indicate the PDCP entity suspending to lower layers of DRB(s), except default DRB(s). The UE may be (pre)configured by the BS with a default DRB that may be used for small data transmission. In some implementations, default DRB(s) may be pre-defined or may be associated with a PDU session. In some implementations, an indication may be included in an RRC Release message to indicate that the UE is allowed to transmit small data in the RRC_INACTIVE state. In some implementations, an indication may be included in an RRC Release message to indicate that the UE is allowed to transmit small data via an RA procedure (e.g., 2-step RA procedure, 4-step RA procedure, 2-step RA procedure fallback to 4-step RA procedure) in the RRC_INACTIVE state. In some implementations, an indication may be included in an RRC Release message to indicate that the UE is allowed to transmit small data via any available RA procedure. In some implementations, an indication may be included in an RRC Release message (or in a suspend configuration of the RRC Release message) to indicate that the UE is allowed to transmit small data via a 2-step RA procedure in the RRC_INACTIVE state. In some implementations, an indication may be included in an RRC Release message (or in a suspend configuration of the RRC Release message) to indicate that the UE is allowed to transmit small data via a 4-step RA procedure in the RRC_INACTIVE state.

In some implementations, if an RRC Release message including a suspend configuration is received by the UE and the allowed logical channel(s) or DRB(s) are indicated, the UE may not suspend all DRB(s) and may not indicate the PDCP entity suspending to lower layers of all DRB(s). In some implementations, if an RRC Release message including a suspend configuration is received by the UE and the allowed logical channel(s) or DRB(s) are indicated, the UE may not suspend any DRB(s) and may not indicate the PDCP entity suspending to lower layers of all DRB(s).

In some implementations, only UL data associated with the allowed logical channel(s) or DRB(s) may be transmitted via an RA procedure (e.g., 2-step RA procedure, 4-step RA procedure, or 2-step RA procedure fallback to 4-step RA procedure) for small data transmission or via an RRC procedure for small data transmission. For example, when the UE is in the RRC_INACTIVE state and there is UL data belonging to allowed logical channel(s) or DRB(s), the UE may perform an RA procedure (or an associated RRC procedure) for small data transmission. Note that the UE may not need to transition to the RRC_CONNECTED state if an RA procedure (or the associated RRC procedure) for small data transmission is performed. In some implementations, if there is UL data that is not associated with the allowed logical channel(s) or DRB(s), the UE may need to send an RRC Resume Request message (e.g., to initiate a normal RRC resume procedure) to the BS. The UE may receive an RRC Resume message sent from the BS and transition to the RRC_CONNECTED state for small data transmission. In some implementations, only UL data associated with the allowed logical channel(s) or DRB(s) may trigger an RA procedure (e.g., 2-step RA procedure, 4-step RA procedure, or 2-step RA procedure fallback to 4-step RA procedure) for small data transmission or via initiating an RRC procedure for small data transmission. If there is other UL data not associated with the allowed logical channel(s) or DRB(s) and if there is still available space on the UL grant, the UE may also transmit the other UL data not associated with the allowed logical channel(s) or DRB(s) on the same UL grant that is used for small data transmission. Note that how to accommodate the other UL data that is not associated with the allowed logical channel(s) or DRB(s) on the same UL grant (or the remaining space on the same UL grant) may rely on a logical channel prioritization mechanism.

Small Data Transmission Via Configured Grants

In some implementations, the BS may provide configured grants (e.g., pre-configured PUSCH resources, configured grant Type 1 configuration) in dedicated signaling (e.g., in an RRC Release message with a suspend configuration). It should be noted that in the present disclosure, a configured grant, a pre-configured PUSCH resource, and a configured grant Type 1 configuration may be exchangeable. If a UE in the RRC_INACTIVE state is configured with pre-configured PUSCH resources, the UE may be allowed to transmit small data on the pre-configured PUSCH resources in the RRC_INACTIVE state without transitioning to the RRC_CONNECTED state. In some implementations, the BS may configure the following parameters when the configured grant Type 1 for the RRC_INACTIVE state is configured:
periodicity: periodicity of the configured grant Type 1;
timeDomainOffset: an offset of a resource with respect to system frame number (SFN)=0 in time domain;
timeDomainAllocation: allocation of configured uplink grant in time domain which contains startSymbolAndLength (i.e., SLIV in TS 38.214 v15.7.0);
nrofHARQ-Processes: the number of HARQ (Hybrid Automatic Repeat reQuest) processes for configured grant.

In some implementations, if Configured Scheduling Radio Network Temporary Identifier (CS-RNTI) (or other RNTI) is not configured in the configured grant Type 1 configuration for a UE in the RRC_INACTIVE state, small data (re)transmission in the RRC_INACTIVE state may not be supported. In some implementations, if CS-RNTI (or other RNTI) is configured in the configured grant Type 1 configuration for a UE in the RRC_INACTIVE state, small data (re)transmission in the RRC_INACTIVE state may be supported. In some implementations, if small data retransmission in the RRC_INACTIVE state is supported, a UE in the RRC_INACTIVE state may monitor the common PDCCH (or common Control Resource Set (CORESET)) addressed by the CS-RNTI (or other RNTI) if the UE in the RRC_INACTIVE state is configured with PUSCH resources for small data transmission in the RRC_INACTIVE state. In some implementations, a UE in the RRC_INACTIVE state may monitor the common PDCCH (or common CORESET) addressed by CS-RNTI (or other RNTI) for deactivation or activation of pre-configured PUSCH resources if the UE in the RRC_INACTIVE state is configured with PUSCH resources for small data transmission in the RRC_INACTIVE state.

In some implementations, the BS may provide pre-configured PUSCH resources with different sizes and periodicities. For example, one or more configured grant configurations may be provided by the BS in dedicated signaling to the UE. In some implementations, a UE in the RRC_INACTIVE state configured with one or more configured grant configurations for small data transmission may determine which configured resource (e.g., PUSCH resources) to use based on the small data size in the buffer and the size of configured resource (e.g., PUSCH resources). For example, the configured grant configuration #1 may be configured with grant size 200 bits and the configured grant configuration #2 may be configured with grant size 800 bits. If the small data size is less than, or equal to 200 bits, the UE may use the configured PUSCH resources based on configured grant configuration #1. Otherwise, the UE may use the configured PUSCH resources based on configured grant configuration #2. In some implementations, a configured grant configuration may be associated with logical channel(s) (or DRB(s)) in the RRC_INACTIVE state. In some implementations, if the sizes of all available configured grants are less than the small data size to be transmitted, the UE may perform an RA procedure for small data transmission. In some implementations, if the sizes of all available configured grants are less than the small data size to be transmitted, the UE may perform an RRC resume procedure. In some implementations, a UE may use configured grants for small data transmission if the small data for transmission (e.g., the UL data in the buffer(s) of the allowed DRB(s)) is smaller than or equal to a data volume threshold (e.g., the size limitation of the configured grants that are configured by the BS).

In some implementations, a UE (e.g., in the RRC_INACTIVE state or in the RRC_CONNECTED state) may receive an RRC Release message with a suspend configuration to indicate the allowed logical channel(s) or DRB(s) in the RRC_INACTIVE state. That is, only the UL data associated with the allowed logical channel(s) or DRB(s) may be transmitted by the UE in the RRC_INACTIVE state via pre-configured PUSCH resources. In some implementations, if an RRC Release message including a suspend configuration is received by the UE and the allowed logical channel(s) or DRB(s) are indicated to the UE, the UE in the RRC_INACTIVE state may suspend all SRB(s) and DRB(s), except SRB 0 and the allowed DRB(s). The UE may indicate the PDCP entity suspending to lower layers of all DRB(s), except the allowed DRB(s).

In some implementations, a UE (e.g., in the RRC_INACTIVE state or in the RRC_CONNECTED state) may receive an RRC Release message with a suspend configuration to indicate the non-allowed logical channel(s) or DRB(s) in the RRC_INACTIVE state. That is, the UL data associated with the non-allowed logical channel(s) or DRB(s) may not be transmitted by the UE in the RRC_INACTIVE via pre-configured PUSCH resources. In some implementations, if an RRC Release message including a suspend configuration is received by the UE (e.g., in the RRC_CONNECTED state or in the RRC_INACTIVE state) and the non-allowed logical channel(s) or DRB(s) are indicated, the UE may suspend all SRB(s) and non-allowed DRB(s), except SRB 0 and other DRB(s). The UE may indicate the PDCP entity suspending to lower layers of non-allowed DRB(s), except other DRB(s).

In some implementations, if an RRC Release message including a suspend configuration is received by the UE (e.g., in the RRC_INACTIVE or in the RRC_CONNECTED UE) and the small data transmission that is allowed in the RRC_INACTIVE state is implicitly or explicitly indicated, the UE in the RRC_INACTIVE state may suspend all SRB(s) and DRB(s), except SRB 0 and default DRB. The UE may indicate the PDCP entity suspending to lower layers of DRB(s), except default DRB. In some implementations, if pre-configured PUSCH resources are provided to a UE for small data transmission in the RRC_INACTIVE state, the UE may consider that small data transmission in the RRC_INACTIVE state is allowed (e.g., via pre-configured PUSCH resources or via an RA procedure (e.g., 2-step RA procedure, 4-step RA procedure, 2-step fallback to 4-step RA procedure)). In some implementations, if pre-configured PUSCH resources are provided to a UE for small data transmission in the RRC_INACTIVE state, the UE may consider that small data transmission in the RRC_INACTIVE state is allowed (e.g., via pre-configured PUSCH resources or via any available RA procedure). In some implementations, if pre-configured PUSCH resources are provided to a UE for small data transmission in the RRC_INACTIVE state, the UE may consider that small data transmission via the pre-configured PUSCH resources in the RRC_INACTIVE state is allowed, but whether small data transmission via an RA procedure is allowed may follow an indication (e.g., via dedicated signaling or via system information as mentioned above) from the BS. In some implementations, if pre-configured PUSCH resources are not provided to a UE for small data transmission in the RRC_INACTIVE state, the UE may consider that small data transmission in the RRC_INACTIVE state via an RA procedure (e.g., 2-step RA procedure, 4-step RA procedure, 2-step fallback to 4-step RA procedure) is allowed.

In some implementations, if an RRC Release message including a suspend configuration is received by the UE (e.g., in the RRC_CONNECTED state or in the RRC_INACTIVE state) and the allowed logical channel(s) or DRB(s) are indicated, the UE may not suspend all DRB(s) and may not indicate PDCP entity suspending to lower layers of all DRB(s).

In some implementations, only UL data associated with the allowed logical channel(s) or DRB(s) may be transmitted via the pre-configured PUSCH resources. For example, when the UE is in the RRC_INACTIVE state and the UL data belonging to the allowed logical channel(s) or DRB(s), the UE may use the pre-configured PUSCH resources for small data transmission. It should be noted that the UE may not need to transition to the RRC_CONNECTED state if pre-configured PUSCH resources (or the associated RRC procedure) for small data transmission are used. In some implementations, only UL data associated with the allowed logical channel(s) or DRB(s) may trigger small data transmission on pre-configured PUSCH resource(s). If there is other UL data not associated with the allowed logical channel(s) or DRB(s) and if there is still available space on the (same) pre-configured PUSCH resource(s), the UE may also transmit the other UL data not associated with the allowed logical channel(s) or DRB(s) on the same pre-configured PUSCH resource(s) that is used for small data transmission. Note that the data accommodation for the other UL data that is not associated with the allowed logical channel(s) or DRB(s) on the same pre-configured PUSCH resource(s) (or the remaining space on the same pre-configured PUSCH resource(s)) may rely on a logical channel prioritization mechanism.

In some implementations, if there is UL data that is not associated with the allowed logical channel(s) or DRB(s) when the UE is in the RRC_INACTIVE state, the UE may need to send an RRC Resume Request message to the BS. The UE in the RRC_INACTIVE state may receive an RRC Resume message or an RRC setup command sent by the BS and transition to the RRC_CONNECTED state for small data transmission.

In some implementations, the BS may indicate whether pre-configured PUSCH resources are allowed for small data transmission to a UE in the RRC_INACTIVE state via dedicated signaling (e.g., an RRC Release message with a suspend configuration).

In some implementations, the UE may determine whether configured grants (e.g., pre-configured PUSCH resources) for small data transmission is valid. In one example, a UE in the RRC_INACTIVE state may not be allowed to transmit small data via the pre-configured PUSCH resources if the UE does not have a valid Timing Advance (TA). That is, the UE determines that the configured grants are invalid when the UE does not have a valid TA associated with the configured grants. In another example, a UE in the RRC_INACTIVE state may not be allowed to transmit small data via the pre-configured PUSCH resources when the UE in the RRC_INACTIVE receives the system information from a cell other than the last serving cell. The last serving cell may be a cell that transmits an RRC Release message including the suspend configuration to the UE. In other words, the UE may determine the configured grants are valid when the UE is camped on a cell from which the UE receives the RRC release message. In an example, the last serving cell may be a cell that requests the UE to transition from the RRC_CONNECTED state to the RRC_INACTIVE state via dedicated signaling (e.g., an RRC Release message including a suspend configuration). In another example, the last serving cell may be a cell that requests the UE in the RRC_INACTIVE state to remain in the RRC_INACTVE state via dedicated signaling (e.g., an RRC Release message including a suspend configuration). In some implementations, a UE in the RRC_INACTIVE state may not be allowed to transmit small data via the pre-configured PUSCH resources upon the UE in the RRC_INACTIVE state moving out of the configured RNA or upon the periodic RNA timer (e.g., T380) expiring. The UE in the RRC_INACTIVE state may be configured with RNA by the last serving cell via an RRC Release message including a suspend configuration. In some implementations, the BS may provide pre-configured PUSCH resources (e.g., configured grant Type 1 configuration) in dedicated signaling (e.g., in an RRC Release message with a suspend configuration) and also a life timer (e.g., a TA timer) for the pre-configured PUSCH resources. For example, the configured grant configuration #1 (for providing PUSCH resources when the UE is in the RRC_INACTIVE state) may be associated with a life timer (e.g., a TA timer). In some implementations, the UE may start a life timer (e.g., a TA timer) for a configured grant after receiving the RRC Release message with the suspend configuration. In one example, a common life timer (e.g., a common TA timer) of one or more configured grants may be provided to the UE. In another example, different life timers (e.g., different TA timers) for different configured grants may be provided. In other examples, a life timer (e.g., a TA timer) may be configured for all pre-configured PUSCH resources. It should be noted that when a life timer (e.g., a TA timer) is running, the associated pre-configured PUSCH resources may be considered as valid. Once the life timer (e.g., the TA timer) expires (or is not running), the UE may consider all pre-configured PUSCH resources as invalid. That is, the UE may not be allowed to use the pre-configured PUSCH resources for small data transmission in the RRC_INACTIVE state. In some implementations, a TA value for a TA timer that is applied for the UE in the RRC_INACTIVE state may be provided in dedicated signaling (e.g., in an RRC Release message with a suspend configuration). In some implementations, if the TA value applied for the UE in the RRC_INACTIVE state is not provided in dedicated signaling, the UE may keep using the current TA value when the UE enters the RRC_INACTIVE state. It should be noted that the current TA value may be the latest applied TA value for UL transmission, or a TA value in the latest received TA command from the BS, but is not limited thereto. In some implementations, a UE may be configured with a (absolute) threshold to determine whether the current TA (or the associated configured grant(s)) is valid or not. For example, a Reference Symbol Received Power (RSRP) threshold may be configured (via dedicated signaling or broadcast system information) to determine whether the current TA (or the associated configured grant(s)) is valid or not. In this case, if the RSRP of the downlink pathloss reference (or the RSRP of the downlink reference signal) is above the threshold, the TA (or the associated configured grant(s)) may be considered as valid and the UE may use the pre-configured PUSCH resources (e.g., the PUSCH resources associated with the downlink reference signal of a Synchronization Signal Block (SSB)) for small data transmission. For example, if one or more SSBs are configured with pre-configured PUSCH resources and one or more SSBs with the corresponding RSRP is greater than the threshold, the UE may randomly select one SSB with the corresponding RSRP greater than the threshold and transmit the UL data via pre-configured PUSCH resource(s) associated with the SSB for small data transmission in the RRC_INACTIVE state.

Note that the abovementioned threshold (e.g., RSRP) for determining whether a configured grant is valid may be replaced by Reference Signal Received Quality (RSRQ), RSSI (Received Signal Strength Indication), or other signal strength measurement for the implementations of the present disclosure. In some implementations, a UE may be configured with a range to determine whether the current TA (or the associated configured grant(s)) is valid or not. For example, an RSRP range may be configured (via dedicated signaling or broadcast system information) to determine whether the current TA (or the associated configured grant(s)) is valid or not. In this case, if the RSRP of the downlink pathloss reference (or the RSRP of the downlink reference signal) is within the range, the TA (or the associated configured grant(s)) may be considered as valid and the UE may use the pre-configured PUSCH resources (e.g., the PUSCH resource(s) associated with the downlink reference signal of an SSB) for small data transmission. In some implementations, a UE in the RRC_INACTIVE state may measure the downlink reference signal (e.g., SSB, Channel State Information Reference Signal (CSI-RS)) from a cell. Based on the measurement result (e.g., the RSRP of the downlink reference signal), the UE may determine whether the preconfigured PUSCH resources (e.g., the PUSCH resources associated with an SSB or a CSI-RS) are valid for small data transmission in the RRC_INACTIVE state.

In some implementations, a UE (e.g., in the RRC_CONNECTED state or in the RRC_INACTIVE state) may be configured with pre-configured PUSCH resources of a cell for small data transmission in the RRC_INACTIVE state. For example, the cell may be identified by the cell Identity and/or the physical cell identity of the source PCell (e.g., the last serving cell) stored in the UE Inactive AS Context. In one example, the UE may consider the configured grants (e.g., pre-configured PUSCH resources) as valid when the UE is camped on a cell from which the UE receives the RRC release message for configured grants. On the other hand, if a UE leaves/move out of the coverage of the cell (e.g., the source PCell) or if a UE does not camp on the cell (e.g., the source PCell) or if a UE is not served by the cell (e.g., the source PCell), the pre-configured PUSCH resources associated with the cell may be considered invalid. In one example, if a UE leaves the coverage of the cell (e.g., the source PCell) or if a UE does not camp on the cell (e.g., the source PCell) or if a UE is not served by the cell (e.g., the source PCell), the pre-configured PUSCH resource associated with the cell may be considered invalid, but the corresponding configured grant Type 1 configuration may be kept by the UE. For example, if the UE moves back to the original serving cell, the configured grants may still be used for small data transmission if the configured grants are still valid (e.g., the configured grants are considered valid based on a TA timer or an RSRP threshold). In another example, if a UE leaves the coverage of the cell (e.g., the source PCell) or if a UE does not camp on the cell (e.g., the source PCell) or if a UE is not served by the cell (e.g., the source PCell), the pre-configured PUSCH resource associated with the cell may be considered invalid, but the corresponding configured grant Type 1 configuration may be removed by the UE. In some implementations, a UE in the RRC_CONNECTED state or in the RRC_INACTIVE state may be configured with pre-configured PUSCH resources of a set of cells for small data transmission in the RRC_INACTIVE state. For example, the set of cells may be the cells belonging to (or part of) the configured RNA. For example, the set of cells may be configured together with the corresponding configured grant Type 1 configuration. In some implementations, a cell may broadcast a common TA value for small data transmission (e.g., via SIB1) for the UEs in the RRC_INACTIVE state. A UE in the RRC_IDLE state or in the RRC_INACTIVE state may receive the broadcast common TA value for small data transmission. The UE in the RRC_INACTIVE state may apply the broadcast common TA value for small data transmission. In some implementations, if a UE in the RRC_INACTIVE state does not receive a TA value from a cell (via dedicated signaling or broadcast system information), the UE may not be allowed to use pre-configured PUSCH resources for small data transmission in the RRC_INACTIVE state.

It should be noted that the UE may perform small data transmission via the configured grant if at least one of the following criteria or condition(s) is fulfilled (1) the size of small data (e.g., the volume of UL data belonging to allowed DRB(s) to be transmitted in buffer(s)) is smaller than or equal to a data volume threshold; (2) configured grant is valid; (3) the UE has a valid TA For example, if the UE is configured with configured grants for small data transmission in the RRC_INACTIVE state and/or is allowed to transmit small data via the configured grants in the RRC_INACTIVE state, the UE may check if the at least one of the criteria mentioned above is fulfilled or satisfied. Note that the volume of UL data belonging to allowed DRB(s) may be calculated based on the associated RLC buffer(s) and associated PDCP buffer(s) of allowed DRB(s).

In some implementations, a UE may be allowed to use a pre-configured PUSCH resource for small data transmission if the UE remains stationary after receiving an RRC Release message with a suspend configuration. In one example, a UE may report its mobility status as stationary to the BS when the UE is in the RRC_CONNECTED state or in the RRC_INACTIVE state. Accordingly (or in response to the reported mobility status as stationary), the BS may provide pre-configured PUSCH resources for the UE in the RRC_INACTIVE state or in the RRC_CONNECTED state to transmit small data when in the RRC_INACTIVE state. In another example, if a UE reports its mobility status as stationary before (e.g., when the UE was in the RRC_CONNECTED state) but the mobility status changes (e.g., when the UE is in the RRC_INACTIVE state), the UE in the RRC_INACTIVE state may not be allowed to use pre-configured PUSCH resources for small data transmission in the RRC_INACTIVE state. In other examples, if a UE changes its mobility status when the UE is in the RRC_INACTIVE state, the UE may need to report the new mobility status to the BS (e.g., by transitioning to the RRC_CONNECTED state and reporting the updated mobility status to the BS, by sending the RRC Resume Request message including the new mobility status). It should be noted that after reporting the updated mobility status to the BS, the UE may stay in an RRC state in which the UE reports the mobility status or stay in the RRC_CONNECTED state, depending on an indication from the BS (e.g., via dedicated signaling).

In some implementations, when a UE transmits UL data (e.g., small data) via pre-configured PUSCH resources, the UE may monitor a pre-configured PDCCH or CORESET (via dedicated signaling or broadcast system information) to receive Acknowledgement (ACK) information (e.g., by monitoring the initial CORESET or CORESET #0 by using C-RNTI, Resume ID, or other RNTI). If the UE does not receive the ACK information associated with the small data transmission, the UE may retransmit the small data. In one example, when a UE does not receive the ACK information for 'N' times in the RRC_INACTIVE state, the UE may consider the pre-configured PUSCH resources as invalid. In an example, 'N' may be configured by a BS (via dedicated signaling or broadcast system information) or pre-defined. In an example, the ACK information for a small data transmission may also carry the new TA value to be applied for small data transmission in the RRC_INACTIVE state.

In some implementations, a cell may broadcast an indication for indicating whether configured grants (e.g., pre-configured PUCCH resources) for small data transmission in the RRC_INACTIVE state is allowed or not. Thus, the UE that receives the indication may perform the small data transmission in the RRC_INACTIVE state via the configured grants if the indication indicates that small data transmission via the configured grants in the RRC_INACTIVE state is allowed.

Fallback to an RA Procedure for Small Data Transmission while Configured Grants are configured for Small Data Transmission In some implementations, if a UE in the RRC_INACTIVE state is configured with PUSCH resources for small data transmission and the small data transmission via an RA procedure is also allowed, the UE may use pre-configured PUSCH resources for small data transmission first. In one example, if a UE in the RRC_INACTIVE state is configured with PUSCH resources for small data transmission and the small data transmission via an RA procedure is also allowed, the UE may use the resource (e.g., PUSCH resource of MSGA or pre-configured PUSCH resource) that is configured first. In another example, if a UE in the RRC_INACTIVE state is configured with PUSCH resources for small data transmission and the small data transmission via an RA procedure is also allowed, the UE may use the resource (e.g., PUSCH resource of MSGA or pre-configured PUSCH resource) that can accommodate the small data (as much as possible). In other examples, if a UE in the RRC_INACTIVE state is configured with PUSCH resources for small data transmission and the small data transmission via an RA procedure is also allowed, the small data transmission via pre-configured PUSCH resources and via RA procedure may not be performed simultaneously.

In some implementations, if a UE in the RRC_INACTIVE state is configured with PUSCH resources for small data transmission, but the pre-configured PUSCH resources are considered as invalid (or condition(s) mentioned above for small data transmission via PUSCH resources is not satisfied), the UE may fallback to transmit small data via an RA procedure (e.g., a 2-step RA procedure, a 4-step RA procedure, or 2-step RA procedure fallback to 4-step RA procedure). It should be noted that the pre-configured PUSCH resources for small data transmission may be considered invalid due to the fact that a life timer (e.g., a TA timer) expires, a UE leaves the coverage of the source PCell whose identity is stored in the UE Inactive AS Context (e.g., the UE and the source PCell may keep the UE Inactive AS Context), or a UE does not receive the ACK information for 'N' times. In some implementations, a BS may indicate whether a fallback mechanism for small data transmission in the RRC_INACTIVE state is applied or not. For example, the BS may indicate that a fallback mechanism for invalid PUSCH resources (or a fallback mechanism when condition(s) for small data transmission via PUSCH resources is not satisfied) is not applied. In this case, if a UE in the RRC_INACTIVE state is configured with PUSCH resources for small data transmission but the pre-configured PUSCH resources are considered invalid (or condition(s) for small data transmission via PUSCH resources is not satisfied), the UE may send an RRC Resume Request message to transition to the RRC_CONNECTED state for small data transmission. For example, the BS may indicate that a fallback mechanism with a 2-step RA procedure for invalid PUSCH resources is applied. In this case, if a UE in the RRC_INACTIVE state is configured with PUSCH resources for small data transmission, but the pre-configured PUSCH resources are considered invalid, the UE may initiate a 2-step RA procedure for the small data transmission in the RRC_INACTIVE state. For example, the BS may indicate that a fallback mechanism with a 4-step RA procedure for invalid PUSCH resources is applied. In this case, if a UE in the RRC_INACTIVE state is configured with PUSCH resources for small data transmission but the pre-configured PUSCH resources are considered invalid, the UE may initiate a 4-step RA procedure for the small data transmission in the RRC_INACTIVE state. For example, the BS may indicate that a fallback mechanism with an RA procedure for invalid PUSCH resources is applied. In this case, if a UE in the RRC_INACTIVE state is configured with PUSCH resources for small data transmission but the pre-configured PUSCH resources are considered invalid, the UE may initiate a 2-step RA procedure or a 4-step RA procedure for the small data transmission in the RRC_INACTIVE state based on a configured threshold for a 2-step RA procedure selection. That is, the UE may select the type of random access (e.g., a 2-step RA procedure or a 4-step RA procedure) based on a network configuration. For example, an RSRP threshold may be used by the UE to select between a 2-step CBRA and a 4-step CBRA at initiation of the RA procedure.

In some implementations, if a fallback mechanism with RA procedure fails, the UE may bar the cell on which the RA procedure is performed and perform a cell reselection. The cell may be barred for a configurable or pre-defined period (e.g., 300 seconds). In some implementations, if a fallback mechanism with RA procedure fails, the UE is prohibited from transmitting small data in the RRC_INACTIVE state for a configurable or pre-defined period. In some implementations, if a fallback mechanism with RA procedure fails, the UE is prohibited from transmitting small data in the RRC_INACTIVE state and may perform an RRC resume procedure to transition to the RRC_CONNECTED state. For example, the UE may transition to the RRC_CONNECTED state after receiving an RRC Resume message from the BS. For another example, the UE may stay in the RRC_INACTIVE state after receiving an RRC Release message with a suspend configuration from the BS.

In some implementations, a UE may report the condition that pre-configured PUSCH resources for small data transmission in the RRC_INACTIVE state become invalid to the BS. In some implementations, a UE may report the condition that small data transmission via an RA procedure in the RRC_INACTIVE state has failed to the BS. In some implementations, a UE may report the condition that small data transmission via a 2-step RA procedure in the RRC_INACTIVE state has failed to the BS. In some implementations, a UE may report the condition that small data transmission via a 4-step RA procedure in the RRC_INACTIVE state has failed to the BS.

Figure 1:
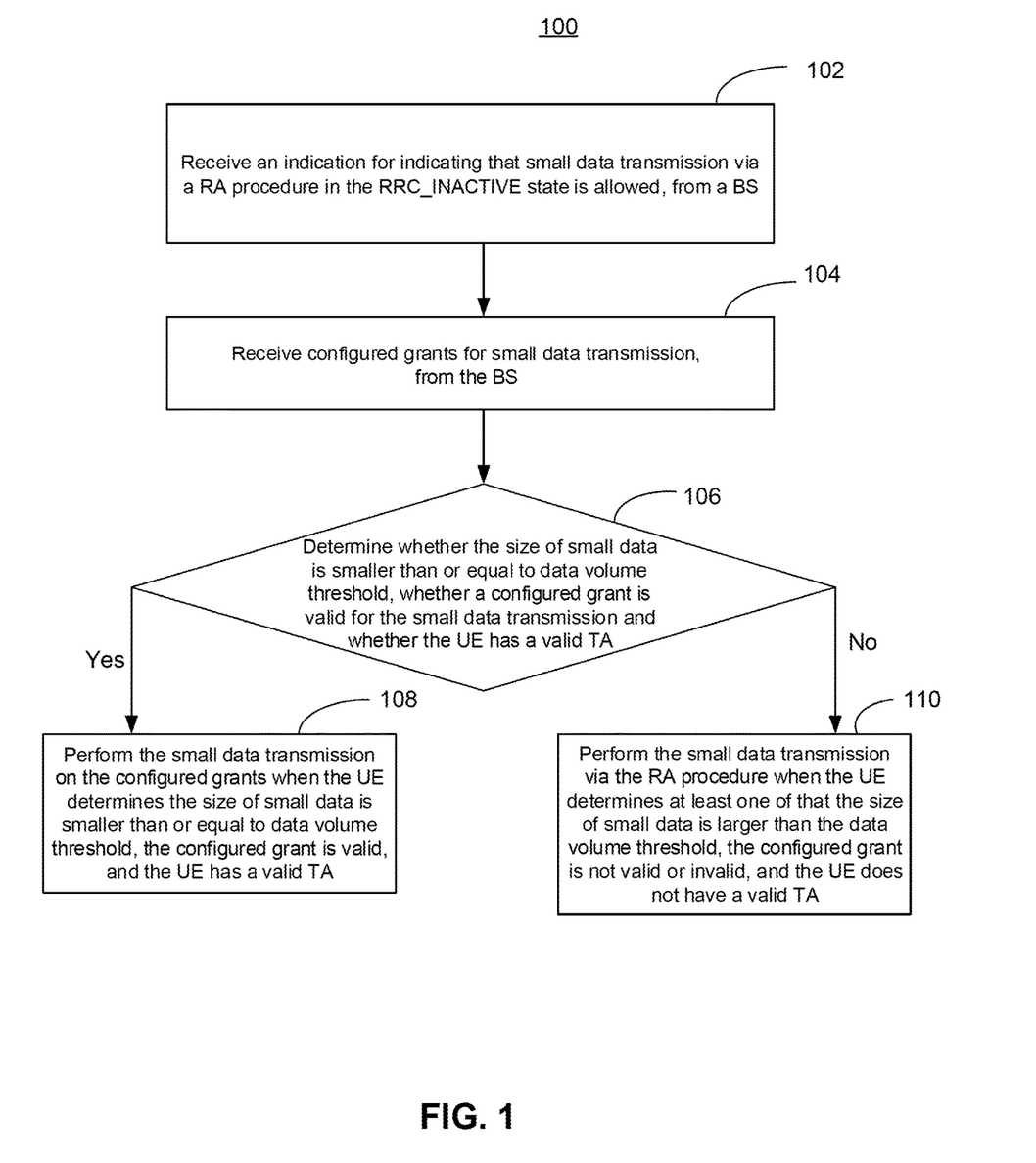
FIG. 1 is a flowchart illustrating a fallback method, according to an implementation of the present disclosure.

FIG. 1 is a flowchart illustrating a fallback method 100, according to an implementation of the present disclosure. As illustrated in FIG. 1, a UE may fallback to an RA procedure for small data transmission when configured grants (e.g., pre-configured PUSCH resources) are configured for small data transmission but at least one predefined condition (e.g., (1) the size of small data is smaller than or equal to data volume threshold; (2) a configured grant is valid; (3) the UE has a valid TA) for the small data transmission via the configured grants is not confirmed/satisfied/fulfilled. In action 102, the UE receives an indication for indicating that small data transmission via an RA procedure (e.g., a 2-step RA procedure or a 4-step RA procedure) in the RRC_INACTIVE state is allowed, from a BS. In action 104, the UE receives configured grants for small data transmission from the BS. Optionally, the UE may receive an indication indicating that small data transmission via the configured grants in RRC_INACTIVE state is allowed in action 104. In action 106, the UE determines whether the size of small data is smaller than or equal to a data volume threshold, whether a configured grant is valid for the small data transmission (e.g., based on a TA timer or an RSRP threshold as mentioned above), and whether the UE has a valid TA. It should be noted that actions 102 and 104 may be optional. In action 108, when the UE determines the size of small data is smaller than or equal to a data volume threshold, the configured grant is valid, and the UE has a valid TA, the UE performs the small data transmission on the configured grants. In action 110, when the UE determines at least one of that the size of small data is larger than the data volume threshold, the configured grant is not valid or invalid, and the UE does not have a valid TA, the UE performs the small data transmission via the RA procedure.

UE Capability for Supporting Small Data Transmission

In some implementations, a UE may report its capability of supporting small data transmission in the RRC_INACTIVE state. In some implementations, a UE may report its capability of supporting small data transmission via an RA procedure in the RRC_INACTIVE state. In some implementations, a UE may report its capability of supporting small data transmission via a 2-step RA procedure in the RRC_INACTIVE state. In some implementations, a UE may report its capability of supporting small data transmission via a 4-step RA procedure in the RRC_INACTIVE state. In some implementations, a UE may report its capability of supporting small data transmission via a 2-step RA procedure fallback to a 4-step RA procedure in the RRC_INACTIVE state. In some implementations, a UE may report its capability of supporting small data transmission via pre-configured PUSCH resources in the RRC_INACTIVE state. In some implementations, a UE that supports small data transmission in the RRC_INACTIVE state may mandatorily support small data transmission via an RA procedure and optionally supports small data transmission via pre-configured PUSCH resources (e.g., a UE may need to signal the capability of supporting small data transmission via pre-configured PUSCH resources in the RRC_INACTIVE state). In some implementations, a UE who supports small data transmission in the RRC_INACTIVE state may mandatorily support small data transmission via a 4-step RA procedure, may optionally support small data transmission via a 2-step RA procedure (e.g., a UE may need to signal the capability of supporting small data transmission via the 2-step RA procedure in the RRC_INACTIVE state), and may optionally support small data transmission via pre-configured PUSCH resources (e.g., a UE may need to signal the capability of supporting small data transmission via pre-configured PUSCH resources in the RRC_INACTIVE state). In some implementations, a UE that supports small data transmission in the RRC_INACTIVE state may mandatorily support small data transmission via pre-configured PUSCH resources, may optionally support small data transmission via a 2-step RA procedure (e.g., a UE may need to signal the capability of supporting small data transmission via the 2-step RA procedure in the RRC_INACTIVE state), and may optionally support small data transmission via a 4-step RA procedure (e.g., a UE may need to signal the capability of supporting small data transmission via the 4-step RA procedure in RRC_INACTIVE state). In some implementations, a UE that supports small data transmission in the RRC_INACTIVE state may mandatorily support small data transmission via pre-configured PUSCH resources and may optionally support small data transmission via an RA procedure (e.g., a UE may need to signal the capability of supporting small data transmission via the RA procedure in the RRC_INACTIVE state).

In some implementations, a UE may report its capability of supporting small data transmission on SUL in the RRC_INACTIVE state.

In some implementations, the UE capability may be separated on Frequency Range 1 (FR1) and Frequency Range 2 (FR2). For example, a UE may report its capability of supporting small data transmission in the RRC_INACTIVE state on FR1 and report another capability of supporting small data transmission in the RRC_INACTIVE state on FR2.

In some implementations, the UE capability may be separated in Time Division Duplex (TDD) mode and Frequency Division Duplex (FDD) mode. For example, a UE may report its capability of supporting small data transmission in the RRC_INACTIVE state in TDD mode and report another capability of supporting small data transmission in the RRC_INACTIVE state in FDD mode.

It should be noted that the abovementioned implementations may also be applicable for other RRC states (e.g., the RRC_IDLE state).

It should be noted that after the UE capability for supporting small data transmission in the RRC_INACTIVE state is transmitted to the BS, the BS may provide the configured grants (e.g., pre-configured PUSCH resources) in an RRC Release message. Thus, the UE in the RRC_INACTIVE state performs the small data transmission via the configured grants when a predefined condition is confirmed/satisfied/fulfilled.

Figure 2:
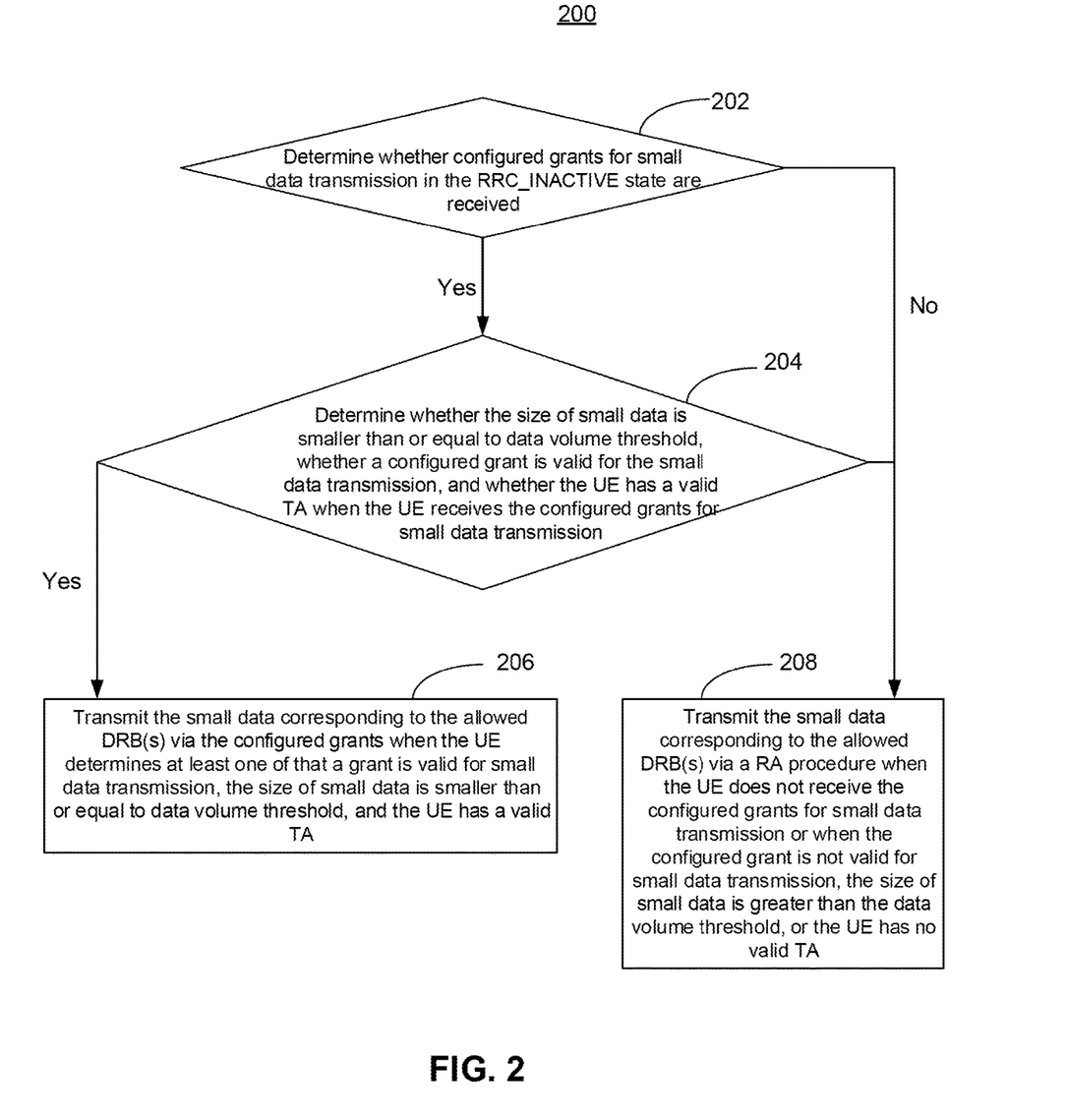
FIG. 2 is a flowchart illustrating a method of small data transmission, according to an implementation of the present disclosure.

FIG. 2 is a flowchart illustrating a method 200 of small data transmission, according to an implementation of the present disclosure. In action 202, the UE determines whether configured grants for small data transmission in the RRC_INACTIVE state are received. Optionally, the UE may receive an indication indicating that small data transmission via the configured grants in RRC_INACTIVE state is allowed in action 202. In an example, a configuration of the configured grants is included in an RRC Release message. It should be noted that the RRC Release message may include at least one of a configuration of a TA timer associated with the configured grants and a configuration of DRB(s) allowed for small data transmission in the RRC_INACTIVE state. In action 204, the UE determines whether the size of small data is smaller than or equal to data volume threshold, whether a configured grant is valid for the small data transmission, and whether the UE has a valid TA when the UE receives the configured grants for small data transmission. In action 206, when the UE determines at least one of that a configured grant is valid for small data transmission, the size of small data is smaller than or equal to data volume threshold, and the UE has a valid TA, the UE transmits the small data corresponding to the allowed DRB(s) via the configured grants. It should be noted that the UE may determine whether the configured grant is valid for the small data transmission based on a TA timer or an RSRP threshold as mentioned above. On the other hand, the UE may transmit the small data corresponding to the allowed DRB(s) via an RA procedure (e.g., the fallback method mentioned above) when the UE does not receive the configured grants for small data transmission or when the configured grant is not valid for small data transmission, the size of small data is greater than the data volume threshold, or the UE has no valid TA (e.g., action 208).

Figure 3:
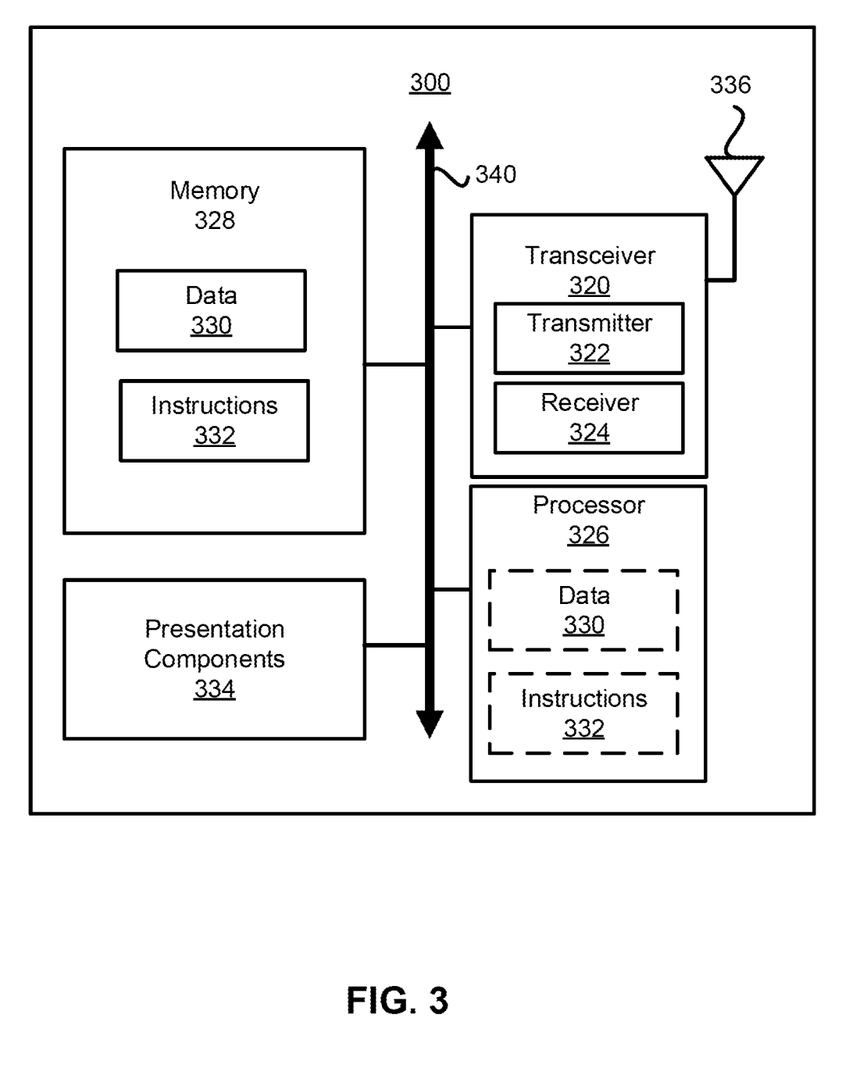
FIG. 3 is a block diagram illustrating a node for wireless communication, according to an implementation of the present disclosure.

FIG. 3 is a block diagram illustrating a node 300 for wireless communication, according to an implementation of the present disclosure.

As illustrated in FIG. 3, the node 300 may include a transceiver 320, a processor 326, a memory 328, one or more presentation components 334, and at least one antenna 336. The node 300 may also include a Radio Frequency (RF) spectrum band module, a BS communications module, a network communications module, and a system communications management module, input/output (I/O) ports, I/O components, and a power supply (not illustrated in FIG. 3). Each of these components may be in communication with each other, directly or indirectly, over one or more buses 340. The node 300 may be a UE or a BS that performs various disclosed functions illustrated in FIG. 2.

The transceiver 320 may include a transmitter 322 (with transmitting circuitry) and a receiver 324 (with receiving circuitry) and may be configured to transmit and/or receive time and/or frequency resource partitioning information. The transceiver 320 may be configured to transmit in different types of subframes and slots including, but not limited to, usable, non-usable and flexibly usable subframes and slot formats. The transceiver 320 may be configured to receive data and control channels.

The node 300 may include a variety of computer-readable media. Computer-readable media may be any media that can be accessed by the node 300 and include both volatile (and non-volatile) media and removable (and non-removable) media. Computer-readable media may include computer storage media and communication media. Computer storage media may include both volatile (and/or non-volatile) media, as well as removable (and/or non-removable) media, implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 328 may include computer-storage media in the form of volatile and/or non-volatile memory. The memory 328 may be removable, non-removable, or a combination thereof. For example, the memory 328 may include solid-state memory, hard drives, optical-disc drives, etc. As illustrated in FIG. 3, the memory 328 may store computer-readable and/or computer-executable instructions 332 (e.g., software codes) that are configured to, when executed, cause the processor 326 (e.g., processing circuitry) to perform various disclosed functions. Alternatively, the instructions 332 may not be directly executable by the processor 326 but may be configured to cause the node 300 (e.g., when compiled and executed) to perform various disclosed functions.

The processor 326 may include an intelligent hardware device, a central processing unit (CPU), a microcontroller, an ASIC, etc. The processor 326 may include memory. The processor 326 may process the data 330 and the instructions 332 received from the memory 328, and information through the transceiver 320, the baseband communications module, and/or the network communications module. The processor 326 may also process information to be sent to the transceiver 320 for transmission via the antenna 336, to the network communications module for transmission to a CN.

One or more presentation components 334 may present data to a person or other devices. Presentation components 334 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of-for small data transmission performed by a user equipment (UE), the method comprising:
   receiving, from a base station (BS), a radio resource control (RRC) release message, the RRC release message including a configured grant configuration and a first timer associated with the configured grant configuration, the configured grant configuration indicating an uplink (UL) resource;
   transitioning to an RRC_INACTIVE state in response to receiving the RRC release message;
   starting the first timer in response to receiving the RRC release message;
   determining whether the UL resource is valid, the UL resource being invalid at least when the first timer expires; and
   transmitting UL data on the UL resource after the UE determines that the UL resource is valid.

2. The method of claim 1, wherein
   the UL resource is further determined to be invalid when a serving cell of the UE is different from a cell that is supported by the BS and from which the UE receives the RRC release message.

3. The method of claim 1, wherein
   the UL resource is further determined to be invalid when a Reference Symbol Received Power (RSRP) of a Synchronization Signal Block (SSB) associated with the UL resource is not greater than a threshold.

4. The method of claim 1, wherein the RRC release message further indicates one or more data radio bearers (DRBs) allowed for a UL data transmission while the UE is in the RRC_INACTIVE state.

5. The method of claim 1, wherein
   the UL resource is further determined to be invalid when a size of the UL data to be transmitted is larger than a threshold associated with the configured grant configuration.

6. The method of claim 1, further comprising:
   reporting, to the BS, a capability of supporting the small data transmission via the configured grant configuration while the UE is in the RRC_INACTIVE state.

7. The method of claim 1, further comprising:
   reporting, to the BS, a capability of supporting the small data transmission via a random access (RA) procedure while the UE is in the RRC_INACTIVE state.

8. The method of claim 7, further comprising:
   determining whether to perform the RA procedure for the small data transmission when the UE determines that the UL resource is invalid.

9. The method of claim 7, further comprising:
   receiving, via system information, from the BS, an indication that indicates whether the RA procedure for the small data transmission is allowed.

10. The method of claim 1, wherein the UL resource includes a physical uplink shared channel (PUSCH) resource.

11. A user equipment (UE) for performing small data transmission, the UE comprising:
    at least one processor; and
    at least one non-transitory computer-readable medium coupled to the at least one processor and storing computer-executable instructions that, when executed by the at least one processor, cause the UE to:
    receive, from a base station (BS), a radio resource control (RRC) release message, the RRC release message including a configured grant configuration and a first timer associated with the configured grant configuration, the configured grant configuration indicating an uplink (UL) resource;
    transition to an RRC_INACTIVE state in response to receiving the RRC release message;
    start the first timer in response to receiving the RRC release message;
    determine whether the UL resource is valid, the UL resource being invalid at least when the first timer expires; and
    transmit UL data on the UL resource after the UE determines that the UL resource is valid.

12. The UE of claim 11, wherein the UL resource is further determined to be invalid when a serving cell of the UE is different from a cell that is supported by the BS and from which the UE receives the RRC release message.

13. The UE of claim 11, wherein the UL resource is further determined to be invalid when a Reference Symbol Received Power (RSRP) of a Synchronization Signal Block (SSB) associated with the UL resource is not greater than a threshold.

14. The UE of claim 11, wherein the RRC release message further indicates one or more data radio bearers (DRBs) allowed for a UL data transmission while the UE is in the RRC_INACTIVE state.

15. The UE of claim 11, wherein the UL resource is further determined to be invalid when a size of the UL data to be transmitted is larger than a threshold associated with the configured grant configuration.

16. The UE of claim 11, wherein the computer-executable instructions, when executed by the at least one processor, further cause the UE to:

report, to the BS, a capability of supporting the small data transmission via the configured grant configuration while the UE is in the RRC_INACTIVE state.

17. The UE of claim 11, wherein the computer-executable instructions, when executed by the at least one processor, further cause the UE to:
report, to the BS, a capability of supporting the small data transmission via a random access (RA) procedure while the UE is in the RRC_INACTIVE state.

18. The UE of claim 17, wherein the computer-executable instructions, when executed by the at least one processor, further cause the UE to:
determine whether to perform the RA procedure for the small data transmission when the UE determines that the UL resource is invalid.

19. The UE of claim 17, wherein the computer-executable instructions, when executed by the at least one processor, further cause the UE to:
receive, via system information, from the BS, an indication that indicates whether the RA procedure for the small data transmission is allowed.

20. The UE of claim 11, wherein the UL resource includes a physical uplink shared channel (PUSCH) resource.

* * * * *